(12) United States Patent
Naithani et al.

(10) Patent No.: US 9,875,414 B2
(45) Date of Patent: Jan. 23, 2018

(54) ROUTE DAMAGE PREDICTION SYSTEM AND METHOD

(71) Applicant: GENERAL ELECTRIC COMPANY, Schenectady, NY (US)

(72) Inventors: Nidhi Naithani, Bangalore (IN); Dattaraj Jagdish Rao, Bangalore (IN); Anju Bind, Bangalore (IN); Sreyashi Dey Chaki, Bangalore (IN)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 14/253,294

(22) Filed: Apr. 15, 2014

(65) Prior Publication Data

US 2015/0294153 A1    Oct. 15, 2015

(51) Int. Cl.
| | | |
|---|---|---|
| *G06K 9/00* | (2006.01) | |
| *G06T 7/00* | (2017.01) | |
| *G06T 7/55* | (2017.01) | |

(52) U.S. Cl.
CPC ........ *G06K 9/00798* (2013.01); *G06T 7/0008* (2013.01); *G06T 7/55* (2017.01);
(Continued)

(58) Field of Classification Search
None
See application file for complete search history.

(56) References Cited

U.S. PATENT DOCUMENTS 2,701,610 A    2/1955 Carlson
3,505,742 A    4/1970 Fiechter
(Continued)

FOREIGN PATENT DOCUMENTS

| CN | 201325416 Y | 10/2009 |
|---|---|---|
| CN | 201821456 U | 5/2011 |

(Continued)

OTHER PUBLICATIONS

Stent, Simon, et al. "An Image-Based System for Change Detection on Tunnel Linings." 13th IAPR International Conference on Machine Vision Applications, Kyoto, Japan. 2013.*
(Continued)

*Primary Examiner* — Vu Le
*Assistant Examiner* — Tracy Mangialaschi
(74) *Attorney, Agent, or Firm* — Global Patent Operation; John A. Kramer (57) ABSTRACT

A route damage prediction system includes cameras, a conversion unit, and an analysis unit. The cameras obtain image data that include a route traveled upon by vehicles. The image data includes still images and/or video of the route obtained at different times. The conversion unit includes one or more computer processors configured to at least one of create wireframe model data or modify the image data into the wireframe model data representative of the route. The analysis unit includes one or more computer processors configured to examine changes in the wireframe model data to identify a historical trend of changes in the image data. The analysis unit is configured to compare the historical trend of the changes in the image data with designated patterns of changes in the wireframe model data to determine when to request at least one of repair, inspection, or maintenance of the route.

19 Claims, 6 Drawing Sheets

(52) U.S. Cl.
CPC ............ *G06T 2207/10016* (2013.01); *G06T 2207/10024* (2013.01); *G06T 2207/20221* (2013.01); *G06T 2207/30252* (2013.01)

(56) References Cited

U.S. PATENT DOCUMENTS

| | | | |
|---|---|---|---|
| 3,581,071 A | 5/1971 | Payseure |
| 3,641,338 A | 2/1972 | Peel et al. |
| 3,864,039 A | 2/1975 | Wilmarth |
| 4,259,018 A | 3/1981 | Poirier |
| 4,281,354 A | 7/1981 | Conte |
| 4,490,038 A | 12/1984 | Theurer et al. |
| 4,654,973 A | 4/1987 | Worthy |
| 4,751,571 A | 6/1988 | Lillquist |
| 4,783,593 A | 11/1988 | Noble |
| 4,915,504 A | 4/1990 | Thurston |
| 5,203,089 A | 4/1993 | Trefouel et al. |
| 5,337,289 A | 8/1994 | Fasching et al. |
| 5,364,047 A | 11/1994 | Petit et al. |
| 5,379,224 A | 1/1995 | Brown et al. |
| 5,429,329 A | 7/1995 | Wallace et al. |
| 5,506,682 A | 4/1996 | Pryor |
| RE35,590 E | 8/1997 | Bezos et al. |
| 5,659,305 A | 8/1997 | Rains et al. |
| 5,717,737 A | 2/1998 | Doviak et al. |
| 5,729,213 A | 3/1998 | Ferrari et al. |
| 5,735,492 A | 4/1998 | Pace |
| 5,786,750 A | 7/1998 | Cooper |
| 5,793,420 A | 8/1998 | Schmidt |
| 5,867,122 A | 2/1999 | Zahm et al. |
| 5,867,404 A | 2/1999 | Bryan |
| 5,867,717 A | 2/1999 | Milhaupt et al. |
| 5,893,043 A | 4/1999 | Daimler-Benz Ag |
| 5,938,717 A | 8/1999 | Dunne et al. |
| 5,954,299 A | 9/1999 | Pace |
| 5,961,571 A | 10/1999 | Gorr et al. |
| 5,978,718 A | 11/1999 | Kull |
| 6,011,901 A | 1/2000 | Kirsten |
| 6,081,769 A | 6/2000 | Curtis |
| 6,088,635 A | 7/2000 | Cox et al. |
| 6,128,558 A | 10/2000 | Kernwein |
| 6,150,930 A | 11/2000 | Cooper |
| 6,163,755 A | 12/2000 | Peer et al. |
| 6,259,375 B1 | 7/2001 | Andras |
| 6,263,266 B1 | 7/2001 | Hawthorne |
| 6,356,299 B1 | 3/2002 | Trosino et al. |
| 6,373,403 B1 | 4/2002 | Korver et al. |
| 6,377,215 B1 | 4/2002 | Halvorson et al. |
| 6,384,742 B1 | 5/2002 | Harrison |
| 6,453,056 B2 | 9/2002 | Laumeyer et al. |
| 6,453,223 B1 | 9/2002 | Kelly et al. |
| 6,487,500 B2 | 11/2002 | Lemelson et al. |
| 6,519,512 B1 | 2/2003 | Haas et al. |
| 6,526,352 B1 | 2/2003 | Breed et al. |
| 6,532,035 B1 | 3/2003 | Saari et al. |
| 6,532,038 B1 | 3/2003 | Haring et al. |
| 6,570,497 B2 | 5/2003 | Puckette, IV et al. |
| 6,600,999 B2 | 7/2003 | Clark et al. |
| 6,631,322 B1 | 10/2003 | Arthur et al. |
| 6,637,703 B2 | 10/2003 | Matheson et al. |
| 6,647,891 B2 | 11/2003 | Holmes et al. |
| 6,712,312 B1 | 3/2004 | Kucik |
| 6,778,284 B2 | 8/2004 | Casagrande |
| 6,831,573 B2 | 12/2004 | Jones |
| 6,952,487 B2 | 10/2005 | Patton et al. |
| 6,995,556 B2 | 2/2006 | Nejikovsky et al. |
| 7,039,367 B1 | 5/2006 | Kucik |
| 7,348,895 B2 | 3/2008 | Lagassey |
| 7,403,296 B2 | 7/2008 | Farritor et al. |
| 7,463,348 B2 | 12/2008 | Chung |
| 7,527,495 B2 | 5/2009 | Yam |
| 7,545,322 B2 | 6/2009 | Newberg et al. |
| 7,571,051 B1 | 8/2009 | Shulman |
| 7,616,329 B2 | 11/2009 | Villar et al. |
| 7,659,972 B2 | 2/2010 | Magnus et al. |
| 7,697,727 B2 | 5/2010 | Xu et al. |
| 7,707,944 B2 | 5/2010 | Bounds |
| 7,742,873 B2 | 6/2010 | Agnew et al. |
| 7,772,539 B2 | 8/2010 | Kumar |
| 7,826,969 B2 | 11/2010 | Hein et al. |
| 7,845,504 B2 | 12/2010 | Davenport et al. |
| 7,908,114 B2 | 3/2011 | Ruggiero |
| 7,965,312 B2 | 6/2011 | Chung et al. |
| 7,999,848 B2 | 8/2011 | Chew |
| 8,180,590 B2 | 5/2012 | Szwilski et al. |
| 8,233,662 B2 | 7/2012 | Bhotika et al. |
| 8,335,606 B2 | 12/2012 | Mian et al. |
| 8,355,834 B2 | 1/2013 | Duggan et al. |
| 8,405,837 B2 | 3/2013 | Nagle, II et al. |
| 8,412,393 B2 | 4/2013 | Anderson et al. |
| 8,576,069 B2 | 11/2013 | Nadeem et al. |
| 8,599,005 B2 | 12/2013 | Fargas et al. |
| 8,649,917 B1 | 2/2014 | Abernathy |
| 8,712,610 B2 | 4/2014 | Kumar |
| 8,744,196 B2 | 6/2014 | Sharma et al. |
| 8,751,073 B2 | 6/2014 | Kumar et al. |
| 8,838,301 B2 | 9/2014 | Makkinejad |
| 8,903,574 B2 | 12/2014 | Cooper et al. |
| 8,942,426 B2 | 1/2015 | Bar-Am |
| 9,049,433 B1 | 6/2015 | Prince |
| 9,108,640 B2 | 8/2015 | Jackson |
| 2001/0050324 A1 | 12/2001 | Greene, Jr. |
| 2002/0003510 A1 | 1/2002 | Shigetomi |
| 2002/0007225 A1 | 1/2002 | Costello et al. |
| 2002/0031050 A1 | 3/2002 | Blevins et al. |
| 2002/0035417 A1 | 3/2002 | Badger et al. |
| 2002/0037104 A1 | 3/2002 | Myers et al. |
| 2002/0101509 A1 | 8/2002 | Slomski |
| 2002/0135471 A1 | 9/2002 | Corbitt et al. |
| 2003/0048193 A1 | 3/2003 | Puckette, IV et al. |
| 2003/0140509 A1 | 7/2003 | Casagrande |
| 2003/0142297 A1 | 7/2003 | Casagrande |
| 2003/0202101 A1 | 10/2003 | Monroe et al. |
| 2004/0056182 A1 | 3/2004 | Jamieson et al. |
| 2004/0064241 A1 | 4/2004 | Sekiguchi |
| 2004/0093196 A1 | 5/2004 | Hawthorne et al. |
| 2004/0182970 A1 | 9/2004 | Mollet et al. |
| 2004/0263624 A1 | 12/2004 | Nejikovsky et al. |
| 2005/0012745 A1 | 1/2005 | Kondo et al. |
| 2005/0018748 A1 | 1/2005 | Ringermacher et al. |
| 2005/0110628 A1 | 5/2005 | Kernwein et al. |
| 2005/0113994 A1 | 5/2005 | Bell et al. |
| 2005/0125113 A1 | 6/2005 | Wheeler et al. |
| 2005/0174582 A1 | 8/2005 | Carr et al. |
| 2005/0205718 A1* | 9/2005 | Tsai ............... B61L 23/041 246/1 R |
| 2005/0284987 A1 | 12/2005 | Kande et al. |
| 2006/0017911 A1 | 1/2006 | Villar et al. |
| 2006/0132602 A1 | 6/2006 | Muto et al. |
| 2006/0244830 A1 | 11/2006 | Davenport et al. |
| 2007/0005202 A1 | 1/2007 | Breed |
| 2007/0027583 A1 | 2/2007 | Tamir et al. |
| 2007/0085703 A1 | 4/2007 | Clark et al. |
| 2007/0170315 A1 | 7/2007 | Manor et al. |
| 2007/0200027 A1 | 8/2007 | Johnson |
| 2007/0216771 A1 | 9/2007 | Kumar |
| 2007/0217670 A1 | 9/2007 | Bar-Am |
| 2007/0284474 A1 | 12/2007 | Olson et al. |
| 2008/0169939 A1 | 7/2008 | Dickens et al. |
| 2008/0304065 A1 | 12/2008 | Hesser et al. |
| 2009/0020012 A1 | 1/2009 | Holten et al. |
| 2009/0037039 A1 | 2/2009 | Yu et al. |
| 2009/0144233 A1 | 6/2009 | Grigsby et al. |
| 2009/0189981 A1 | 7/2009 | Siann et al. |
| 2009/0314883 A1 | 12/2009 | Arlton et al. |
| 2010/0004804 A1* | 1/2010 | Anderson ............... B61K 9/08 701/19 |
| 2010/0039514 A1 | 2/2010 | Brand |
| 2010/0073480 A1 | 3/2010 | Hoek et al. |
| 2011/0064273 A1 | 3/2011 | Zarembski et al. |
| 2011/0115913 A1 | 5/2011 | Lang et al. |
| 2011/0216200 A1 | 9/2011 | Chung et al. |
| 2011/0285842 A1 | 11/2011 | Davenport et al. |
| 2012/0089537 A1 | 4/2012 | Cooper et al. |

(56) References Cited

U.S. PATENT DOCUMENTS

| | | |
|---|---|---|
| 2012/0192756 A1 | 8/2012 | Miller et al. |
| 2012/0263342 A1 | 10/2012 | Haas et al. |
| 2012/0274772 A1 | 11/2012 | Fosburgh et al. |
| 2012/0300060 A1 | 11/2012 | Farritor |
| 2013/0018766 A1 | 1/2013 | Christman |
| 2013/0191070 A1 | 7/2013 | Kainer et al. |
| 2013/0233964 A1 | 9/2013 | Woodworth et al. |
| 2013/0286204 A1 | 10/2013 | Cheng |
| 2014/0003724 A1 | 1/2014 | Feris et al. |
| 2014/0012438 A1 | 1/2014 | Shoppa et al. |
| 2014/0036063 A1 | 2/2014 | Kim et al. |
| 2014/0036076 A1 | 2/2014 | Nerayoff et al. |
| 2014/0067167 A1 | 3/2014 | Levien et al. |
| 2014/0071269 A1 | 3/2014 | Mohamed et al. |
| 2014/0129154 A1 | 5/2014 | Cooper et al. |
| 2014/0142868 A1 | 5/2014 | Bidaud |
| 2014/0266882 A1 | 9/2014 | Metzger |

FOREIGN PATENT DOCUMENTS

| | | | |
|---|---|---|---|
| DE | 19529986 A1 | 2/1997 | |
| DE | 19938267 A1 | 2/2001 | |
| DE | 102005029956 A1 | 2/2006 | |
| EP | 0093322 A2 | 11/1983 | |
| EP | 0117763 A2 | 9/1984 | |
| EP | 0378781 A1 | 7/1990 | |
| EP | 0605848 A1 | 7/1994 | |
| EP | 0761522 A1 | 3/1997 | |
| EP | 0893322 A1 | 1/1999 | |
| EP | 1236634 A1 | 9/2002 | |
| EP | 1600351 B1 | 11/2005 | |
| EP | 953491 B1 | 12/2005 | |
| GB | 2384379 A | 7/2003 | |
| GB | 2403861 A | 1/2005 | |
| KR | 20130119633 A | 11/2013 | |
| KR | 20140017735 A | 2/2014 | |
| WO | 02058984 A1 | 8/2002 | |
| WO | 2006112959 A2 | 10/2006 | |
| WO | 2007096273 A1 | 8/2007 | |
| WO | 2012150591 A2 | 11/2012 | |
| WO | 2013086578 A1 | 6/2013 | |
| WO | 2013121344 A2 | 8/2013 | |
| WO | WO 2015015494 A1 * | 2/2015 | ........ B61L 15/0081 |

OTHER PUBLICATIONS

Eden, Ibrahim, and David B. Cooper. "Using 3d line segments for robust and efficient change detection from multiple noisy images." Computer Vision—ECCV 2008. Springer Berlin Heidelberg, 2008. 172-185.*

Rutzinger M, Rüf B, Vetter M, Höfle B. Change detection of building footprints from airborne laser scanning acquired in short time intervals. na; Jul. 5, 2010.*

Zerbst, Uwe, Manfred Schödel, and René Heyder. "Damage tolerance investigations on rails." Engineering Fracture Mechanics 76.17 (2009): 2637-2653.*

Li, Qingyong, and Shengwei Ren. "A real-time visual inspection system for discrete surface defects of rail heads." IEEE Transactions on Instrumentation and Measurement 61.8 (2012): 2189-2199.*

Yao, Tingting, et al. "Image based obstacle detection for automatic train supervision." Image and Signal Processing (CISP), 2012 5th International Congress on. IEEE, 2012.*

Nassu, Bogdan Tomoyuki, and Masato Ukai. "Rail extraction for driver support in railways." Intelligent Vehicles Symposium (IV), 2011 IEEE. IEEE, 2011.*

Karakose, Mehmet, et al. "A New Computer Vision Based Method for Rail Track Detection and Fault Diagnosis in Railways." (2017).*

PCT Search Report and Written Opinion issued in connection with corresponding PCT Application No. PCT/US2015/016151 dated May 27, 2015.

Nicholls et al., "Applying Visual Processing to GPS Mapping of Trackside Structures," Proc. 9th British Machine Vision Conference, Southampton, pp. 841-851, 1998.

Saab A Map Matching Approach for Train Positioning Part I: Development and Analysis, IEEE Transactions on Vehicular Technology, vol. No. 49, Issue No. 2, pp. 467-475, Mar. 2000.

Oertel et al., "A Video-Based Approach for Stationary Platform Supervision", Intelligent Transportation Systems, 2002 Proceedings of IEEE 5th International Conference, pp. 892-897, 2002.

Stella et al., "Visual Recognition of Missing Fastening Elements for Railroad Maintenance", Intelligent Transportation Systems, The IEEE 5th International Conference, pp. 94-99, 2002.

Kim et al., "Pseudo-Real Time Activity Detection for Railroad Grade Crossing Safety", Intelligent Transportation Systems Proceedings of IEEE, vol. No. 2, pp. 1355-1361, 2003.

Hirokawa et al., "Threading the Maze," GPS World, pp. 20-26, Nov. 2004.

U.S. Non-Final Office Action issued in connection with related U.S. Appl. No. 10/361,968 dated Aug. 30, 2006.

PCT Search Report and Written Opinion issued in connection with related PCT Application No. PCT/US2005/039829 dated Mar. 22, 2007.

U.S. Final Office Action issued in connection with related U.S. Appl. No. 10/361,968 dated Apr. 24, 2007.

PCT Search Report and Written Opinion issued in connection with related PCT Application No. PCT/US2007/068780 dated Jan. 2, 2008.

PCT Search Report and Written Opinion issued in connection with related PCT Application No. PCT/US2008/061478 dated Jul. 24, 2008.

Unofficial English Translation of Mexican Office Action issued in connection with related MX Application No. 2003/004888 dated Sep. 10, 2008.

Rahmani et al., "A Novel Network Design for Future IP-Based Driver Assistance Camera Systems", Networking, Sensing and Control, 2009. ICNSC '09. International Conference on, IEEE Xplore, pp. 457-462, Mar. 2009.

European Office Action issued in connection with related EP Application No. 07783663.3 dated Jun. 10, 2009.

Kaleli et al., "Vision-Based Railroad Track Extraction Using Dynamic Programming", Proceedings of the 12th International IEEE Conference on Intelligent Transportation Systems, pp. 42-47, Oct. 2009.

Oh et al., "Performance Analysis of Vision Based Monitoring System for Passenger's Safety on Railway Platform", Control Automation and Systems (ICCAS), 2010 International Conference, pp. 1867-1870, 2010.

Unofficial English Translation of Chinese Office Action issued in connection with related CN Application No. 200780024969.0 dated Jul. 26, 2010.

U.S. Non-Final Office Action issued in connection with related U.S. Appl. No. 11/146,831 dated Sep. 21, 2010.

Masuko et al., "Autonomous Takeoff and Landing of an Unmanned Aerial Vehicle", System Integration (SII), 2010 IEEE/SICE International Symposium on, pp. 248-253, Dec. 21-22, 2010.

U.S. Non-Final Office Action issued in connection with related U.S. Appl. No. 11/479,559 dated Feb. 3, 2011.

U.S. Non-Final Office Action issued in connection with related U.S. Appl. No. 11/750,681 dated May 18, 2011.

Guofang et al.,"Research on Real-Time Location-Tracking of Underground Mine Locomotive Based on Wireless Mobile Video", Mechatronic Science, Electric Engineering and Computer (MEC), 2011 International Conference on, IEEE Xplore, pp. 625-627, Aug. 19-22, 2011.

U.S. Final Office Action issued in connection with related U.S. Appl. No. 11/479,559 dated Aug. 16, 2011.

U.S. Final Office Action issued in connection with related U.S. Appl. No. 11/750,681 dated Oct. 14, 2011.

U.S. Non-Final Office Action issued in connection with related U.S. Appl. No. 13/194,517 dated Dec. 19, 2012.

U.S. Final Office Action issued in connection with related U.S. Appl. No. 13/194,517 dated Jul. 15, 2013.

PCT Search Report and Written Opinion issued in connection with related PCT Application No. PCT/US2015/013720 dated Apr. 28, 2015.

(56) References Cited

OTHER PUBLICATIONS

PCT Search Report and Written Opinion issued in connection with related PCT Application No. PCT/US2015/013735 dated May 1, 2015.
PCT Search Report and Written Opinion issued in connection with related PCT Application No. PCT/US2015/014355 dated May 15, 2015.
U.S. Non-Final Office Action issued in connection with related U.S. Appl. No. 14/479,847 dated Jun. 10, 2015.
U.S. Non-Final Office Action issued in connection with related U.S. Appl. No. 14/479,847 dated Nov. 18, 2015.
U.S. Non-Final Office Action issued in connection with related U.S. Appl. No. 14/479,847 dated Apr. 21, 2016.
U.S. Non-Final Office Action issued in connection with related U.S. Appl. No. 14/485,398 dated Jun. 15, 2016.
European Search Report and Opinion issued in connection with corresponding EP Application No. 15184083.2 dated Jun. 16, 2016.
U.S. Non-Final Office Action issued in connection with related U.S. Appl. No. 14/217,672 dated Jul. 15, 2016.
U.S. Appl. No. 14/217,672, filed Mar. 18, 2014, Nidhi Naithani et al.
U.S. Appl. No. 14/541,370, filed Nov. 14, 2014, Mark Bradshaw Kraeling et al.
U.S. Appl. No. 14/624,069, filed Feb. 17, 2015, Brad Thomas Costa et al.
U.S. Appl. No. 14/884,233, filed Oct. 15, 2015, Aadeesh Shivkant Bhagwatkar et al.
U.S. Appl. No. 14/485,398, filed Sep. 12, 2014, Mark Bradshaw Kraeling et al.
U.S. Appl. No. 61/940,610, filed Feb. 17, 2014, Mark Bradshaw Kraeling et al.
U.S. Appl. No. 14/457,353, filed Aug. 12, 2014, Mark Bradshaw Kraeling et al.
U.S. Appl. No. 14/479,847, filed Sep. 8, 2014, Nidhi Naithani et al.
U.S. Appl. No. 10/361,968, filed Feb. 10, 2003, Jeffrey James Kisak et al.
U.S. Appl. No. 11/479,559, filed Jun. 30, 2006, David M. Davenport et al.
U.S. Appl. No. 11/750,681, filed May 18, 2007, Ajith Kuttannair Kumar.

\* cited by examiner

ROUTE DAMAGE PREDICTION SYSTEM AND METHOD

FIELD

Embodiments of the subject matter disclosed herein relate to examining routes traveled by vehicles for predicting damage to the routes.

BACKGROUND

Routes that are traveled by vehicles may become damaged over time with extended use. For example, tracks on which rail vehicles travel may become broken, cracked, pitted, misaligned, or the like, over time. This damage can pose threats to the safety of the rail vehicles, the passengers located thereon, and nearby persons and property. For example, the risks of derailment of the rail vehicles can increase when the tracks become damaged.

Some known systems and methods that inspect the tracks involve emitting visible markers on the tracks and optically monitoring these markers to determine if the tracks have become misaligned. These visible markers may be created using laser light, for example. But, these systems and methods can require additional hardware in the form of a light emitting apparatus, such as a laser light source. This additional hardware increases the cost and complexity of the systems, and can require specialized rail vehicles that are not used for the conveyance of passengers or cargo. Additionally, these systems and methods typically require the rail vehicle to slowly travel over the tracks so that the visible markers can be examined.

Other known systems and methods involve injecting electric current into the tracks and examining changes to the current to identify open circuits caused by breaks in the tracks. But, these systems and methods also may require additional hardware to inject the current and to sense the current, and may be prone to false identifications of damage to the route.

BRIEF DESCRIPTION

In one example of the inventive subject matter, a system (e.g., a route damage prediction system) includes one or more cameras, a conversion unit, and an analysis unit. The cameras are configured to obtain image data within one or more fields of view of the one or more cameras that include a route that is traveled upon by plural different vehicles. The image data includes at least one of still images or video of the route obtained at different times. The conversion unit includes one or more computer processors configured to at least one of create wireframe model data or modify the image data into the wireframe model data representative of the route. The analysis unit includes one or more computer processors configured to examine changes in the wireframe model data to identify a historical trend of changes in the image data. The analysis unit is configured to compare the historical trend of the changes in the image data with designated patterns of changes in the wireframe model data to determine when to request at least one of repair, inspection, or maintenance of the route.

In another example of the inventive subject matter described herein, a method (e.g., for predicting damage to a route) includes receiving image data having one or more fields of view that include a route that is traveled upon by plural different vehicles. The image data includes at least one of still images or video of the route obtained at different times. The method also includes at least one of creating wireframe model data or modifying the image data into the wireframe model data representative of the route, examining changes in the wireframe model data to identify a historical trend of changes in the image data, and comparing the historical trend of the changes in the image data with designated patterns of changes in the wireframe model data to determine when to request at least one of repair, inspection, or maintenance of the route.

In another example of the inventive subject matter described herein, a system (e.g., a route damage prediction system) includes a conversion unit and an analysis unit. The conversion unit is configured to receive image data acquired at different times, the image data representing at least one of images or video of a common segment of a route traveled by vehicles. The conversion unit configured to create wireframe model data from the image data. The analysis unit is configured to examine the wireframe model data to identify changes in the wireframe model data over time. The analysis unit also can be configured to examine the changes in the wireframe model data to determine when to request at least one of repair, maintenance, or inspection of the common segment of the route.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

One or more examples of the inventive subject matter described herein include systems and methods for imaging a route traveled by one or more vehicles over time and, based on image data acquired of the route by imaging systems on the one or more vehicle systems, predicting when repair or maintenance of the route is needed. For example, a history of the image data can be inspected to determine if the route exhibits a pattern of degradation over time. Based on this pattern, a services team (e.g., a group of one or more personnel and/or equipment) can identify which sections of the route are trending toward a bad condition or already are in bad condition, and then may proactively perform repair and/or maintenance on those sections of the route to avoid future accidents.

In one aspect, cameras mounted on the vehicles are oriented toward the route being traveled upon to capture image data (e.g., still images and/or videos) as the vehicles move on the routes at the same or different times. The cameras can be mounted relatively close to route to obtain high quality image data of the route. The image data can be communicated from the vehicles to an examination system disposed off-board the vehicles. Optionally, all or part of the examination system can be disposed onboard one or more of the vehicles. The image data can be communicated from the vehicles to the examination system periodically, in response to receiving a command or request for the image data, when the vehicles enter into one or more designated locations (e.g., a vehicle yard such as a rail yard), or otherwise. The examination system can include one or more computing devices (e.g., computers, such as remote servers). The image data from multiple different vehicles acquired at different times of the same segments of the route can be examined to determine changes in the condition of the route. The image data obtained at different times of the same segments of the route can be examined in order to filter out external factors or conditions, such as the impact of precipitation (e.g., rain, snow, ice, or the like) on the appearance of the route, from examination of the route.

As one example, the examination system can receive image data from different vehicles, convert the image data into wireframe model data, and examine changes in the wireframe model data over time to predict when the route will need maintenance and/or repair. The image data can be converted into the wireframe model data by identifying pixels or other locations in the image data that are representative of the same or common edges, surfaces, or the like, of objects in the image data. The pixels or other locations in the image data that represent the same objects, surfaces, edges, or the like, may be identified by the examination system by determining which pixels or other locations in the image data have similar image characteristics and associating those pixels or other locations having the same or similar image characteristics with each other.

The image characteristics can include the colors, intensities, luminance, locations, or other information of the pixels or locations in the image data. Those pixels or locations in the image data having colors (e.g., wavelengths), intensities, and/or luminance that are within a designated range of each other and/or that are within a designated distance from each other in the image data may be associated with each other by the examination system. The examination system can group these pixels or locations with each other because the pixels or locations in the image data likely represent the same object (e.g., a rail of a track being traveled by a rail vehicle).

The pixels or other locations that are associated with each other can be used to create a wireframe model of the image data, such as an image that represents the associated pixels or locations with lines of the same or similar colors, and other pixels or location with a different color. The examination system can generate different wireframe models of the same segment of a route from different sets of image data acquired at different times (and/or by imaging systems onboard different vehicles). The examination system can compare these different wireframe models and, depending on the differences between the wireframe models that are identified by the examination system, identify and/or predict damage to the route, and/or when maintenance and/or repair is needed for the route.

In one aspect, the examination system may have different predicted amounts of damage to the route associated with different changes in the wireframe data. For example, detection of a bend or other misalignment in the route based on changes in the wireframe model data may be associated with more damage to the route than other types of changes in the wireframe model data. As another example, the changing of a solid line in earlier wireframe model data to a segmented line in later wireframe model data can be associated with different degrees of damage to the route based on the number of segments in the segmented line, the size of the segments and/or gaps between the segments in the segmented line, the frequency of the segments and/or gaps, or the like. Based on the degree of damage identified from changes in the wireframe model data, the examination system may automatically order maintenance and/or repair of the route.

Figure 1:
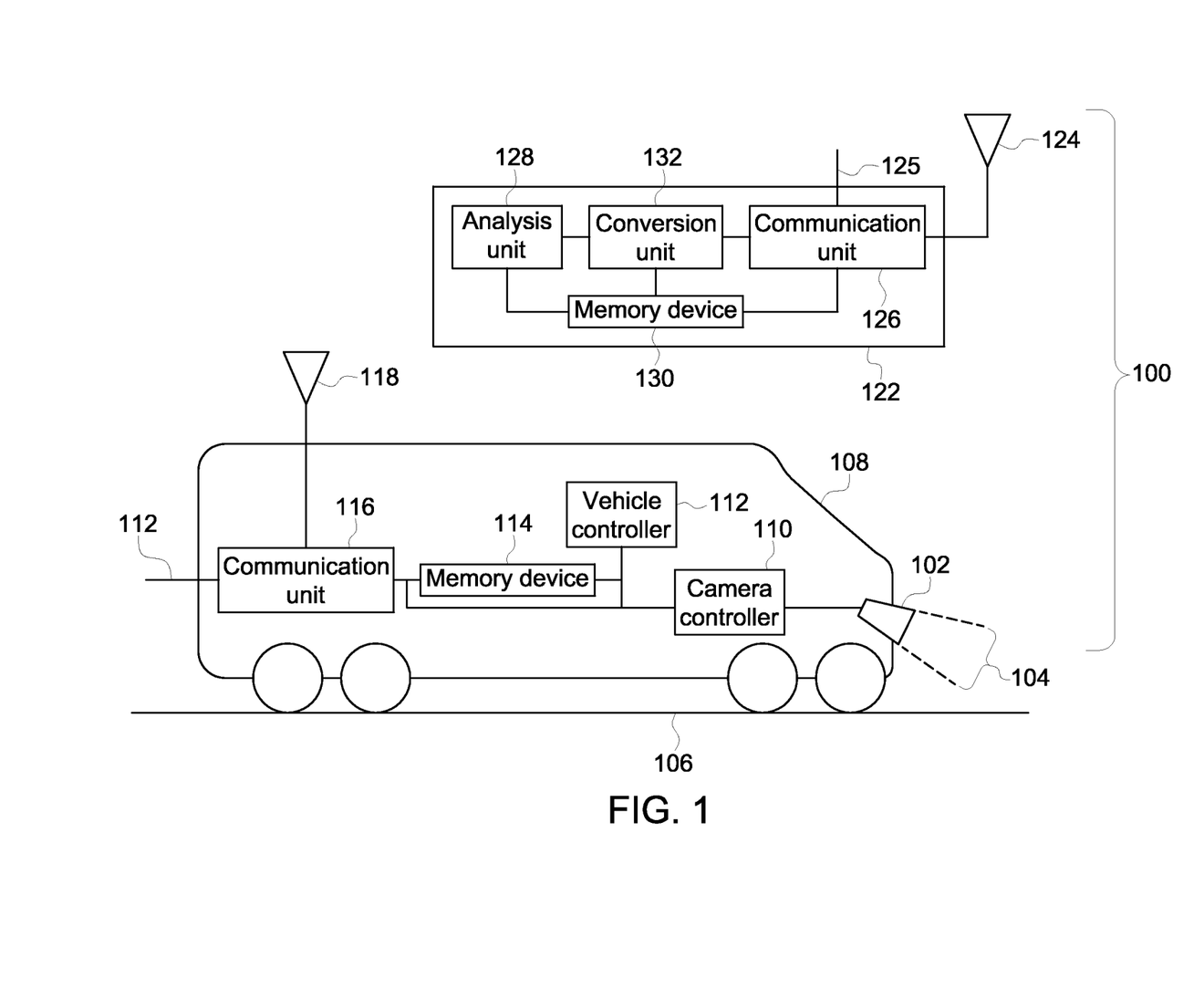
FIG. 1 illustrates a route damage prediction system according to one example embodiment of the inventive subject matter described herein.

FIG. 1 illustrates a route damage prediction system 100 according to one example embodiment of the inventive subject matter described herein. The system 100 includes one or more cameras 102 that are configured to obtain image data within a field of view 104 of the cameras 102. The field of view 104 includes a route 106 being traveled by a vehicle 108. As a result, the image data encompasses still images and/or videos of the route 106.

The vehicle 108 is described and shown herein as representing a rail vehicle, such as a locomotive or other rail vehicle. Optionally, the vehicle 108 may represent another vehicle, such as another off-highway vehicle. An off-highway vehicle can include a mining vehicle or other vehicle that is not designed or permitted for travel on public roadways. The vehicle 108 alternatively may represent an automobile or other type of vehicle. The route 106 may represent a track formed of one or more rails, a road, or other type of surface on which vehicle 108 can move.

Several different vehicles 108 may include different cameras 102 that travel over the same route 106 to obtain image data of the same sections of the route 106 at different times. Optionally, one or more cameras 102 that obtain image data of the route 106 can be disposed off-board the vehicles 108. For example, one or more of the cameras 102 can be part of a wayside device that remains stationary with respect to the ground on which the route 106 is disposed.

The cameras 102 obtain image data that includes still images and/or videos of the route 106 at different times. For example, the image data generated by the cameras 102 can represent the same parts of the route 106 at different hours, days, weeks, months, years, or other time periods. The image data can be obtained by the cameras 102 while the vehicles 108 are moving along the route 106. For example, the cameras can obtain the image data while the vehicles 108 are moving at an upper speed limit associated with the route, such as a track speed of the route.

The cameras 106 can be operatively connected with a camera controller 110. By operatively connected, it is meant that the camera 102 can be connected with the camera controller 110 by one or more wired and/or wireless connections, such as one or more wires, cables, buses, wireless networks, train lines, multiple unit cables or the like. The camera controller 110 represents and/or includes hardware circuitry and/or circuits, that include and/or are connected with one or more computer processors, such as one or more microprocessors or other electronic logic-based devices. The camera controller 110 controls operations of the camera 102, such as controlling when the camera 102 obtains and/or generates image data, the settings of the camera 102 (e.g., focal point, aperture size, resolution, or the like), or other aspects of the camera 102. For example, the camera controller 110 can control time periods when the camera 102 is ON and obtaining image data, the resolution of the camera 102 (such as the number of pixels per unit area of the camera 102), the type of image data obtained by the camera 102 (such as whether or not the camera is obtaining the image data as still images, video, or other types of images).

A vehicle controller 112 of the vehicle 108 includes or represents hardware circuitry and/or circuits that include and/or are connected with one or more computer processors, such as one or more microprocessors or other electronic logic-based devices. The vehicle controller 112 controls operations of the vehicle 108. The vehicle controller 112 can be used to manually and/or autonomously control the tractive effort and/or breaking effort of the vehicle 108, among other functions, and may include or represent one or more input and/or output devices such as throttles, levers, peddles, or the like.

A memory device 114 disposed onboard the vehicle 108 can include or represent one or more computer readable storage devices, such as a computer hard-drive, an optical drive, a flash drive, an electrically programmable read only memory, a random accessible memory, a read only memory, or another type of computer readable memory device. The memory device 114 can store the image data that is output by the camera 102. Optionally, the memory device 114 may be disposed off-board the vehicle 108.

A communication unit 116 disposed onboard the vehicle 108 allows the image data to be communicated from the vehicle 108. As used herein, the term "unit" can refer to hardware circuits or circuitry that include and/or are connected with one or more processors, such as one or more computer microprocessors or other computer processors, or other electronic logic-based devices. The communication unit 116 can include transceiving equipment and/or circuitry which may include and/or be connected with one or more devices that can wirelessly communicate information to one or more off-board devices, such as an antenna 118. Additionally or alternatively, the communication unit 116 can include and/or be connected with transceiving equipment and/or circuitry that communicate signals over one or more wired connections 120, such as a cable, bus, wire, train line, multiple unit cable, or the like. The wired connection 120 can be used to communicate the image data to another vehicle (e.g., a vehicle that is mechanically coupled with the illustrated vehicle 108 to travel together along the route 106 in a vehicle consist) and/or to an off-board location, such as when the vehicle 108 is stationary and the wired connection 120 is connected with another wired connection to communicate the image data off of the vehicle 108.

The system 100 can include an examination system 122 that receives image data of the route 106 obtained by camera 102 on the same or different vehicles 108. The image data that represents the same segment of the route 106 can be acquired by cameras on the same or different vehicles 108 at different times. The examination system 122 is shown as being off-board the vehicle 108, but optionally may be partially or entirely disposed onboard one or more vehicles 108.

The examination system 122 includes a communication unit 126. The communication unit 126 can be similar to the communication unit 116 that is onboard the vehicle 108. For example, the communication unit 126 can include transceiving equipment and/or hardware, such as an antenna 124, that wirelessly communicates with the communication unit 116 to receive the image data. Optionally, the communication unit 126 can include one or more wired connections 125 that can receive the image data from the communication unit 116 when the wired connections 112, 125 are directly or indirectly connected with each other.

The communication unit 126 communicates with the communication unit 116 in order to receive the image data obtained by the cameras 102. The communication unit 126 can communicate with several vehicles 108 in order to obtain and examine the image data obtained and/or generated by the cameras 102 of the different vehicles 108. A memory device 130 of the system 122 may be similar to the memory device 114 onboard the vehicle 108. For example, the memory device 130 can include one or more computer readable storage media that stores the image data obtained by one or more cameras 102 disposed onboard one or more different vehicles 108. The image data can be communicated from the vehicles 108 to the memory device 130 at regular intervals (e.g., by wireless communication or otherwise), on demand by an operator of the vehicle 108, on demand by an operator of the system 122, when the vehicles 108 enter into a designated area (e.g., a vehicle yard, such as a rail yard), or the like.

A conversion unit 132 of the system 122 can change the format, appearance, type, or the like, of the image data of the route 106 that is provided by the vehicle 108. The conversion unit 132 can change a still image and/or video of the route 106 that was obtained by the camera 102 into a wireframe model or wireframe model data of the route 106. Optionally, the conversion unit 132 can modify the image data in other ways.

Figure 2:
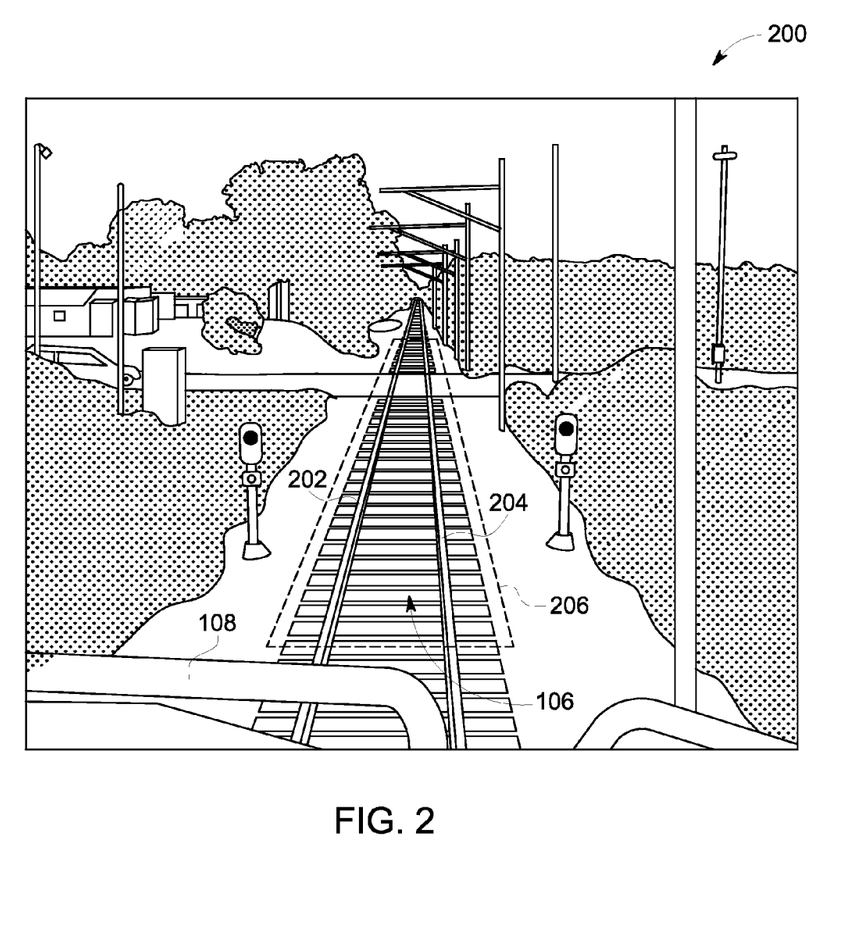
FIG. 2 illustrates an image representative of image data acquired by a camera onboard a vehicle shown in FIG. 1 according to one example of the inventive subject matter described herein.

With continued reference to the examination system 122 shown in FIG. 1, FIG. 2 illustrates an image 200 representative of image data acquired by the camera 102 onboard the vehicle 108 shown in FIG. 1 according to one example of the inventive subject matter described herein. The image 200 shows an upcoming segment 206 of the route 106 being traveled upon by the vehicle 108. The image 200 may be formed from several pixels or other spatial segments (e.g., areas) of the image 200, with the pixels or other spatial segments having varying image characteristics (e.g., various colors, intensities, luminance, or the like).

The conversion unit 132 can examine the image characteristics of the pixels or other spatial segments to determine which pixels or spatial segments having similar image characteristics. With respect to the image 200, the conversion unit 132 can determine that the pixels or spatial segments that represent rails 202, 204 of the route 106 have similar image characteristics, as well as other portions of the image 200. The pixels or spatial segments having the same or similar image characteristics (e.g., within a designated range of each other) are associated with a first group of the pixels or spatial segments of the image 200. Other pixels or spatial segments having different image characteristics (e.g., outside of the designated range) may not be associated with the first group. Optionally, these other pixels or spatial segments may be associated with one or more other groups of pixels or spatial segments based on the image characteristics.

Figure 3:
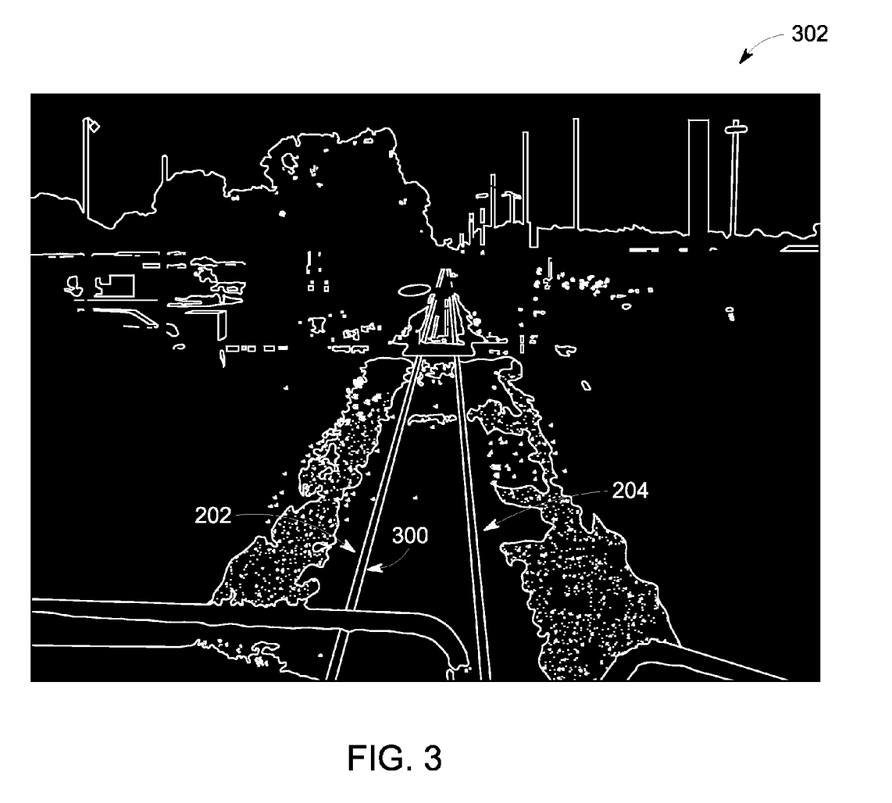
FIG. 3 illustrates wireframe model data of the image data shown in FIG. 2 according to one example of the inventive subject matter described herein.

With continued reference to the examination system 122 shown in FIG. 1 and the image 200 shown in FIG. 2, FIG. 3 illustrates wireframe model data 302 of the image data illustrated as the image 200 in FIG. 2 according to one example of the inventive subject matter described herein. The conversion unit 132 may change the image data into the wireframe model data 302 by identifying one or more edges, surfaces, or locations in the image data that belong to or represent the same objects. For example, the conversion unit 132 can examine the image characteristics (e.g., intensities, colors, luminance, or the like) of different locations in the image data. The conversion unit 132 may then identify which pixels or other locations in the image data have the same or similar image characteristics. Pixels or other locations in the image data may have the same or similar colors, intensities, luminance, or the like, when the pixels or locations have intensities, colors, luminance, or the like, that are equivalent or within a designated threshold range of one another. The conversion unit 132 can group these pixels or locations with each other because the pixels or locations having the same or similar image characteristics may represent the same object. Other pixels or other locations having different image characteristics can be exploded from this group and/or placed into one or more other groups.

Optionally, pixels or locations in the image data may be placed into the group if the pixels or locations are within a threshold distance of each other. For example, in selecting the pixels for inclusion in the group of pixels having same or similar image characteristics, the conversion unit 132 may exclude the pixels that are very far from each other in the image 200 from the group even if the pixels that are located far from each other have similar or identical image characteristics. The pixels having similar image characteristics but located far from each other in the image 200 may not represent the same object, surface, edge, or the like, even though the image characteristics are similar. Optionally, the conversion unit 132 can include the pixels having similar image characteristics but located far from each other if these pixels are connected by one or more other sets of pixels having the same or similar image characteristics.

The conversion unit 132 can create the wireframe model data 302 by assigning a first image characteristic to the pixels or other locations in the group and assigning a different, second image characteristics to other pixels or locations that are not in the group. For example, the conversion unit 132 can modify the image characteristics of the pixels or create a new data set (e.g., a wireframe model data set) having image characteristics that are assigned based on whether the pixels are included in the group of pixels having similar or equivalent image characteristics. In the illustrated example, the pixels or locations in the group are assigned a white color while other pixels or locations are assigned a black color. Optionally, other colors or other image characteristics may be used. As a result, a wireframe image 302 is generated as shown in FIG. 3.

The wireframe image 302 includes white pixels or lines 300 that represent objects in the field of view 104 of the camera 102 (shown in FIG. 1). In the illustrated example, the lines 300 more clearly represent edges of the rails 202, 204 of the route 106 shown in the image 200. Other lines in the wireframe image 302 represent other objects captured in the field of view of the camera 102 that had similar image characteristics as the rails 202, 204.

In one aspect, the conversion unit 132 combines image data of the route 106 obtained at different times into one or more sets of wireframe model data. The wireframe image 302 can represent one such set of wireframe model data. For example, for each of first, second, third, and so on, image data of the route 106 obtained at different times, the conversion unit 132 may create corresponding first, second, third, and so on, wireframe model data of the image data. The conversion unit 132 may then combine the first, second, third, and so on, wireframe model data into aggregate wireframe model data. In order to combine the wireframe model data, the conversion unit 132 may identify those pixels or other locations in the first, second, third, and so on, wireframe model data having a designated image characteristic (e.g., the color white, as shown in FIG. 3). If those pixels having the designated image characteristic appear in the same or approximately the same location in at least a threshold number or percentage of the first, second, third, and so on, wireframe model data, then the conversion unit 132 may create the aggregate wireframe model data to have the designated image characteristic at the same pixels.

Additionally or alternatively, the conversion unit 132 can combine several different sets of image data into combined image data, and then create the wireframe model data from the combined image data. For example, first, second, third, and so on, image data of the route 106 can be obtained at different times and then combined by the conversion unit 132. The conversion unit 132 may combine the first, second, third, and so on, image data by calculating or estimating image characteristics for different pixels or other locations in the image data that are representative of the image data across the first, second, third, and so on, image data. As one example, the conversion unit 132 can calculate an average, median, or the like, of the image characteristic for a pixel, with the values used to calculate the average, median, or the like, obtained from the different image characteristics for that pixel in the first, second, third, and so on, image data. This may be repeated for other pixels in the image data to create the combined image data. The combined image data may then be used to create the wireframe model data, as described above.

Combining the wireframe model data, or combining the image data into combined image data and then creating the wireframe model data from the combined image data, can reduce the impact of visual noise on identification or prediction of damage to the route 106. For example, image data obtained at different times may result in at least some of the image data being acquired when objects are present on the route 106, such as precipitation (e.g., snow, ice, or the like), leaves or other vegetation, or other foreign objects. But, other image data of the same segment of the route 106 that is obtained at other times may not include the objects on the route 106. If just the image data obtained when the objects were on the route 106 is examined to identify or predict damage to the route 106, then these objects may be incorrectly identified by the system 122 as damage or a trend toward damage. Combining the image data and/or combining the wireframe model data based on image data acquired at different times can lessen the impact of these temporary or transitory objects on the route 106 when the wireframe model data is examined to identify or predict damage to the route 106.

For example, the image characteristic of a pixel may be approximately constant for several sets of image data acquired at different times. One set of image data may be acquired at a time when snow was on the route 106. The presence of the snow may cause the image characteristic of that pixel to be significantly different from the image characteristic of the pixel in the image data acquired at other times. But, combining the image data (e.g., by calculating an average or median image characteristic) can result in the image characteristic of the pixel in the combined image data to be closer to the image characteristics of the pixel in the image data acquired at times other than when snow was on the route 106 than to the image characteristic of the pixel in the image data acquired when snow was on the route 106.

Returning to the description of the system 100 shown in FIG. 1, the examination system 122 can include an analysis unit 128 that includes hardware circuits or circuitry that include and/or are connected with one or more computer processors, such as one or more computer microprocessors or other electronic logic-based devices. The analysis unit 128 examines the image data obtained at the different times to identify changes (e.g., historical trends) in the route 106 as shown in the image data. For example, the analysis unit 128 can compare different sets of wireframe model data to determine if the route 106 is changing over time. The different sets of the wireframe model data can represent image data acquired at different times. The analysis unit 128 can determine if the size, shape, or the like of the route 106 as shown in the wireframe model data is changing, how the route 106 is changing as reflected in the wireframe model data, or the like. Based on these changes, the analysis unit 128 can predict if and/or when the route 106 is in need of repair and/or maintenance.

Figure 4:
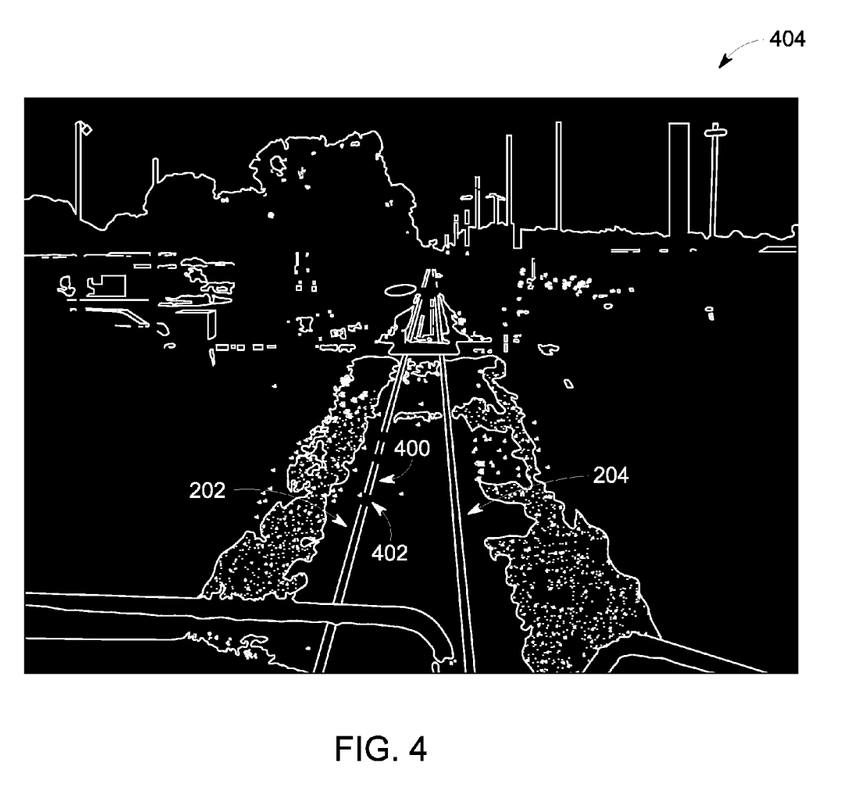
FIG. 4 illustrates wireframe model data 404 representative of the image data acquired of a route shown in FIG. 1 according to another example of the inventive subject matter described herein.

FIG. 4 illustrates wireframe model data 404 representative of the image data acquired of the route 106 according to another example of the inventive subject matter described herein. The image data used to create the wireframe model data 404 shown in FIG. 4 may be image data acquired later and/or at different times than the image data used to create the wireframe model data 302 shown in FIG. 3. As shown in the wireframe model data 302 in FIG. 3, the rails 202, 204 are represented by elongated, substantially parallel or parallel lines 300. But, as shown in the wireframe model data 404, the rail 202 is no longer formed from such elongated lines 300. Instead, the rail 202 is separated into shorter, discrete segments 400 of approximately parallel lines. These segments 400 are separated by gaps 402. In the illustrated example there are four (4) segments 400 separated by three (3) gaps 402. These gaps 402 may be present because the image data used to create the wireframe model data 404 does not have pixels or locations with similar or the same intensities, color, luminance or the like in the locations of the gaps 402 as are in the segments 400. Consequently, when the conversion unit 132 creates the wireframe model data 404, the rail 202 is no longer formed from longer lines 300. Instead, the rail 202 is separated into discreet separated segments 400 which are separated by gaps 402. Conversely the rail 204 is still predominantly formed from the longer lines 300 that also appear in the wireframe model data FIG. 3. This may indicate that the rail 202 has undergone changes over time. The rail 204, however, has not undergone these similar changes as the rail 204 appears similar in the wireframe model data 302 and the subsequently acquired image data used to create the wireframe model data 404.

Figure 5:
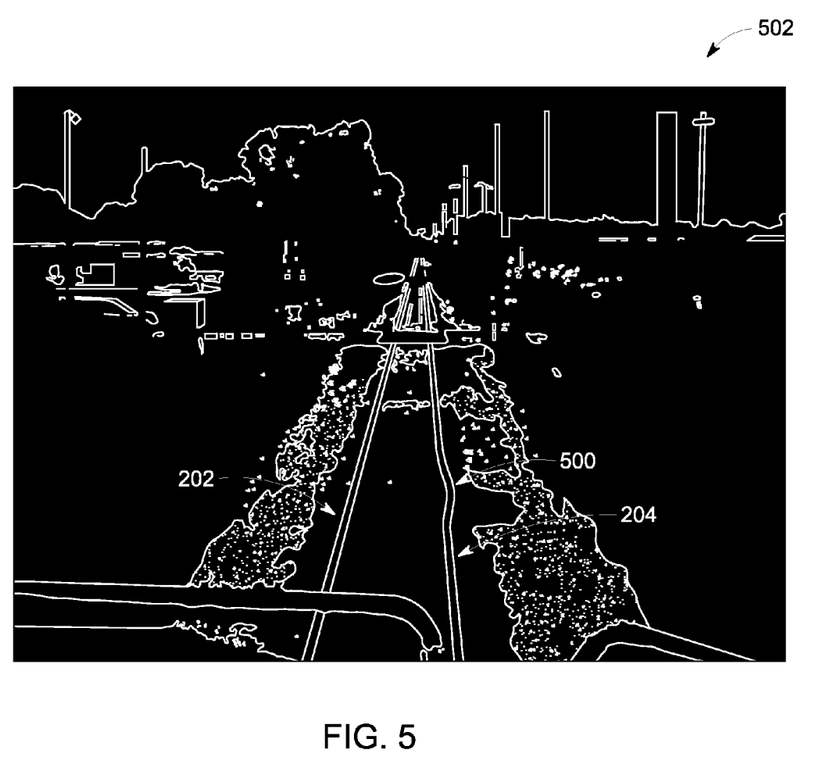
FIG. 5 illustrates additional wireframe model data representative of image data acquired of the route shown in FIG. 1 according to another example of the inventive subject matter described herein.

FIG. 5 illustrates additional wireframe model data 502 representative of the image data acquired of the route 106 according to another example of the inventive subject matter described herein. The image data used to create the wireframe model data 502 may be image data acquired later and/or at different times than the image data used to create the wireframe model data 302 shown in FIG. 3 and/or the wireframe model data 404 shown in FIG. 4.

As shown in FIG. 5, the lines 300 representative of the right rail 204 have shifted or moved from previous positions shown in the wireframe model data 302, 404. For example, the image data used to generate the wireframe model data in FIG. 3 and/or FIG. 4 may be obtained at an earlier point in time or over periods of time that precede when the image data used to generate the wireframe model data 502 in FIG. 5. The wireframe model data 502 illustrates the right rail 204 bending or shifting to the right slightly relative to positions of the right rail 204 in the wireframe model data 302, 404. For example, the right rail 204 shown in FIG. 5 includes a bent or non-linear portion 500 relative to the lines 300 representative of the right rail 204 shown in FIGS. 3 and 4.

Returning to the description of the system 100 shown in FIG. 1, the analysis unit 128 can examine the wireframe model data and identify changes in the wireframe model data over time. For example, the wireframe model data of a section of the route 106 may be updated periodically, on demand, or at other times. When the wireframe model data is updated, the analysis unit 128 can compare the updated wireframe model data to the previous wireframe model data to determine if the wireframe model data has changed. With respect to a comparison between the wireframe model data 302 and the wireframe model data 404, the analysis unit 128 can determine that the wireframe model data is changing in that the lines 300 representative of the left rail 202 are breaking up into smaller segments 400 separated by gaps 402. With respect to a comparison between the wireframe model data 302 and/or 404 and the wireframe model data 502, the analysis unit 128 can determine that the wireframe model data is changing in that the lines 300 representative of the right rail 204 are bending at the bent portion 500.

The analysis unit 128 can identify a historical trend or changes in the wireframe model data over time and compare this trend to designated patterns of damage to the route 106. As one example, the analysis unit 128 may count the number of gaps 402 and/or segments 400 that appear or develop over time in the wireframe model data. The changes in the number of segments 400 and/or gaps 402 can represent a historical trend of changes in the route 106. In another example, the analysis unit 128 may measure the size (e.g., length) of the segments 400 and/or the gaps 402, and monitor changes in the sizes of the segments 400 and/or gaps 402 as a historical trend of changes in the route 106. As another example, the analysis unit 128 can examine changes in location and/or shapes of the lines 300 representative of the rails 202, 204. For example, the analysis unit 128 can examine the wireframe model data over time to determine if the lines 300 move, bend (e.g., become less linear), or otherwise change shape. These changes in the lines 300 can represent another historical trend of changes in the route 106.

The memory device 130 can store different designated changes in the wireframe model data, and these designated changes can be associated with different trends of damage to the route 106. The designated changes can be referred to as designated patterns, as the changes represent patterns of change in the route 106 over time. For example, different numbers of segments 400 and/or gaps 402 in the wireframe model data may be associated with different types of damage. Smaller numbers of segments 400 and/or gaps 402 may be associated with pitting or other surface damage to the route 106, which larger numbers of the segments 400 and/or gaps 402 may be associated with more severe damage, such as breaks in the rails 202, 204. As the number of the segments and/or gaps increases over time, the route may be in more urgent need of repair and/or maintenance.

As another example, smaller distances that the lines representative of the rails 202, 204 move or change shape between different sets of wireframe model data may indicate slight displacement of the rails 202, 204, while larger distances that the lines move and/or change shape may indicate that the rails 202, 204 are severely damaged or misaligned. Increased movement of these lines over time may indicate a more urgent need of repair and/or maintenance.

The analysis unit 128 can determine the actual changes in the wireframe model data from the comparisons of the wireframe model data (e.g., the actual historical trend of the route 106) and compare these actual changes with the designated patterns stored in the memory device 130 (or elsewhere). If the actual changes match one or more designated patterns, then the analysis unit 128 can identify the type and/or severity of the damage associated with the matching designated pattern as being the actual type and/or severity of the damage to the route 106. For example, the analysis unit 128 can determine that development of a relatively small number of segments 400 and/or gaps 402 in the wireframe model data may more closely match a first pattern (indicative of a small amount of surface damage to the route 106) than one or more other patterns (that indicate more severe damage). As a result, the analysis unit 128 can determine that the actual changes in the wireframe model data indicate a small amount of surface damage to the route 106. As another example, the analysis unit 128 can determine that development of a large gap 402 in the wireframe model data may more closely match a second pattern (indicative of a break in the route 106) than one or more other patterns (that indicate less severe damage). As a result, the analysis unit 128 can determine that the actual changes in the wireframe model data indicate a break in the route 106. In another example, the analysis unit 128 can determine that the movement of the lines 300 in the bent portion 500 of the wireframe model data more closely matches a third pattern (indicative of misalignment in the route 106) than one or more other patterns (that indicate no misalignment, a lesser amount of misalignment, or a greater amount of misalignment). As a result, the analysis unit 128 can determine that the actual changes in the wireframe model data indicate some bending in the route 106.

Based on the type and/or severity of the damage to the route 106, the analysis unit 128 can predict if and/or when repair, maintenance, inspection, or other actions need to be taken with respect to the route 106. For example, more severe damage to the route 106 (e.g., a break) may require repair before other degrees of damage to the route 106 (e.g., minor corrosion). Similarly, some bending of the route 106 may require inspection, but not urgent inspection, of the route 106. The analysis unit 128 can direct the communication unit 126 to communicate a request signal to one or more locations. This request signal can be sent to direct personnel to repair the route, inspect the route, and/or maintain the route based on the comparison between the historical trend in changes on the image data with the designated patterns of changes in the image data. The request signal can inform the recipients of the signal of the location of the damage to the route 106, the type of damage, and/or the severity of the damage to the route 106.

Figure 6:
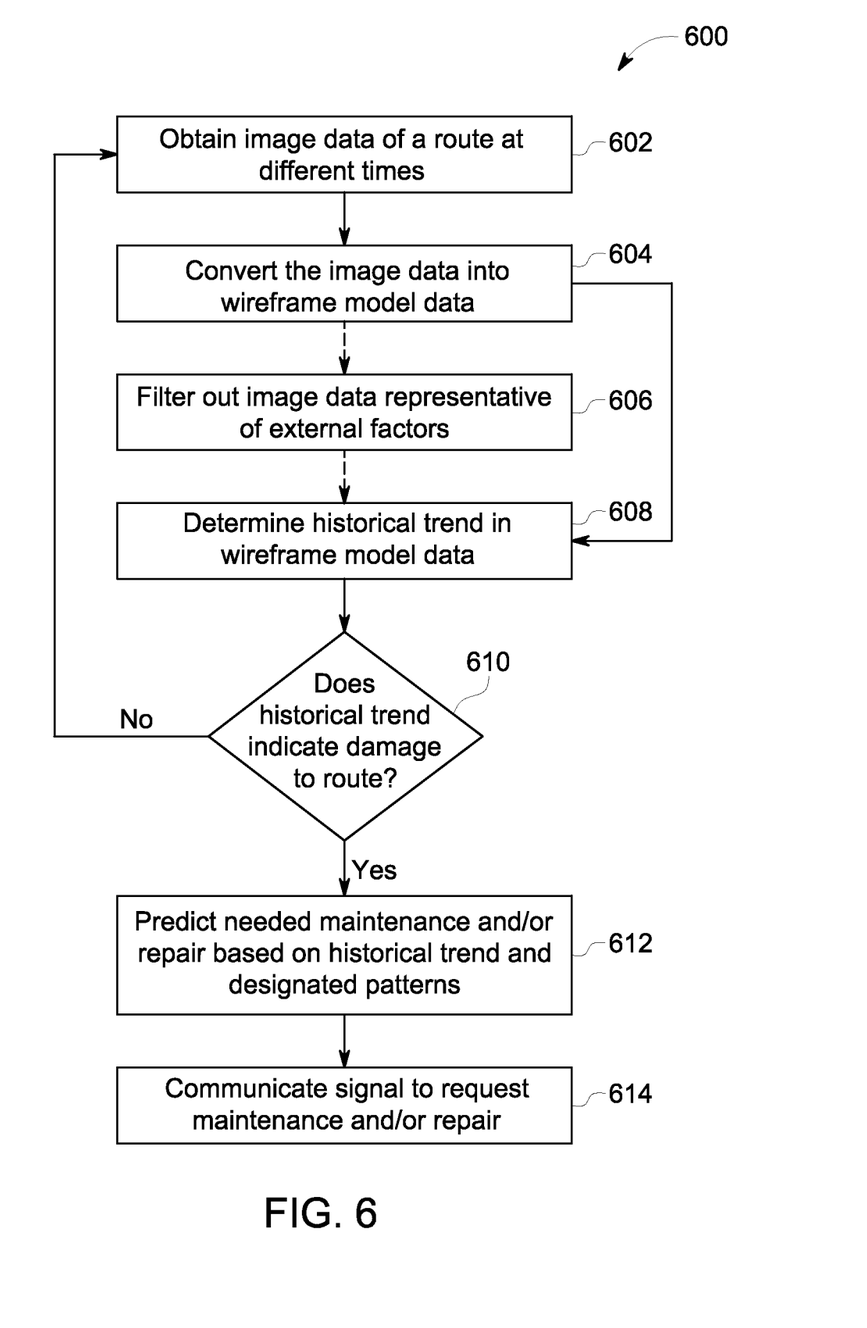
FIG. 6 illustrates a flow chart of a method for analyzing image data over time of a route to predict when repair and/or maintenance of the route may be needed according to an example embodiment of the inventive subject matter described herein.

FIG. 6 illustrates a flow chart of a method 600 for analyzing image data over time of a route to predict when repair and/or maintenance of the route may be needed according to an example embodiment of the inventive subject matter described herein. The method 600 may be performed by one or more embodiments of the systems 100, 122 described herein.

At 602, image data of a route is obtained at different times. As described above, this can result from different vehicle systems having cameras disposed onboard obtaining pictures and/or video of the same portions of the route at different times and over extended periods of time. Optionally, the image data also may include images and/or video obtained by stationary wayside devices or other cameras.

At 604, this image data is converted into wireframe model data. As described above, the image data may be converted into wireframe model data by examining image characteristics of the image data over time. The wireframe model data by can be created by assigning different image characteristics (e.g., colors, intensities, etc.) to different groups of pixels or other locations in the image data that have the same or similar image characteristics.

Optionally, at 606, different sets of wireframe model data can be combined to filter out image data that represents temporary external factors. For example, the wireframe model data can be averaged or otherwise combined so that the impact or significance of image characteristics that are based on precipitation, vegetation, or the like, can be reduced in the wireframe model data relative to the image characteristics that represent the route. Alternatively, the operations of 606 are not performed.

At 608, the wireframe model data is examined to determine if there is a historical trend in changes to the route. For example, the lines representative of rails and/or other surfaces of the route may be examined and/or compared between wireframe model data representative image data acquired at different times. Changes in the lines, such as changing shapes, locations, sizes, or the like, can indicate degradation of the route.

At 610, a determination is made as to whether the historical trend of changes in the wireframe model data indicates damage to the route and/or a need for maintenance. For example, the breaking up of a line in the wireframe model data into a number of shorter segments may be compared to designated numbers of segments stored in a memory device. Depending on which one of these designated numbers of segments matches the actual number of segments that the line has been broken up in to, the method 600 can determine if the route is degrading and/or the severity of degradation.

Based on the different types and/or severity and/or damage and/or degradation to the route, as determined from the changes in the wireframe model data over time, the method 600 may determine how urgent the need for maintenance and/or repair is. For example, the breaking up of a line in the wireframe model data based on previously acquired image data into many more segments may indicate that maintenance and/or repair will be needed sooner than if the line were not broken up or were broken up in to fewer segments. Similarly, smaller changes in inter rail spacing may reflect a less urgent need for maintenance and/or repair to the route. But, larger changes in inter rail spacing may reflect a less urgent need for maintenance and/or repair to the route.

If the changes in the wireframe model data indicate damage to the route and/or damage that is need of repair and/or maintenance, then flow of the method 600 can continue to 612. On the other hand, if there are no changes, the changes do not indicate worsening damage to the route, and/or the changes do not indicate damage that is need of repair and/or maintenance, then flow of the method 600 can return to 602.

At 612, the type of maintenance and/or repair that is needed on the route based on the historical changes in the wireframe model data. For example, if the changes in the wireframe model data indicate slight movements in the route, then the changes may indicate that the route should be examined for movement of the rails during the next scheduled inspection of the route, but that no extra inspection needs to be performed. But, if the changes in the wireframe model data indicate larger movements in the route, then the changes may indicate that the route should be examined very soon and, if necessary, prior to the next scheduled inspection of the route.

At 614, one or more request signals are communicated (e.g., autonomously, without operator intervention), to request repair and/or maintenance to the route. For example, depending on how severe the damage and/or how urgent the repair and/or maintenance is needed to the route, the method may send an appropriate message to one or more facilities and/or personnel to inspect, repair and/or maintain the route.

In another example of the inventive subject matter, a system (e.g., a route damage prediction system) includes one or more cameras, a conversion unit, and an analysis unit. The cameras are configured to obtain image data within one or more fields of view of the one or more cameras that include a route that is traveled upon by plural different vehicles. The image data includes at least one of still images or video of the route obtained at different times. The conversion unit includes one or more computer processors configured to at least one of create wireframe model data or modify the image data into the wireframe model data representative of the route. The analysis unit includes one or more computer processors configured to examine changes in the wireframe model data to identify a historical trend of changes in the image data. The analysis unit is configured to compare the historical trend of the changes in the image data with designated patterns of changes in the wireframe model data to determine when to request at least one of repair, inspection, or maintenance of the route. Multiple instances of "one or more processors" does not mean the analysis unit and the conversion unit are embodied in different processors, although that is a possibility. Instead, the one or more processors of the conversion unit may be the same as the one or more processors of the analysis unit, such that in one embodiment the conversion unit and the analysis unit are embodied in the same processor or the same multiple processors.

In one aspect, the system also includes a communication unit configured to communicate a request signal to direct the at least one of repair, inspection, or maintenance of the route to be performed based on comparing the historical trend of the changes in the image data with the designated patterns.

In one aspect, the conversion unit is configured to create the wireframe model data from different sets of the image data of the route acquired at the different times by the different vehicles.

In one aspect, the conversion unit is configured to at least one of create the wireframe model data or modify the image data into the wireframe model data by identifying at least one of pixels or other locations in the image data having image characteristics that are within designated ranges of each other and assigning a common image characteristic in the wireframe model data to the at least one of pixels or other locations having the image characteristics that are within the designated ranges of each other.

In one aspect, the image characteristics include at least one of intensities, colors, or luminance.

In one aspect, the analysis unit is configured to filter out changes in the image data caused by external factors other than damage to the route, wherein the wireframe model data that is examined by the analysis unit to identify the historical trend includes the wireframe model data after filtering out the changes in the image data caused by the external factors.

In one aspect, the historical trend of changes in the image data includes at least one of changes in a number of lines representative of the route in the image data, changes in spacing between segments of the lines in the image data, changes in lengths of the lines or the segments of the lines, or changes in gaps between the segments of the lines.

In another example of the inventive subject matter described herein, a method (e.g., for predicting damage to a route) includes receiving image data having one or more fields of view that include a route that is traveled upon by plural different vehicles. The image data includes at least one of still images or video of the route obtained at different times. The method also includes at least one of creating wireframe model data or modifying the image data into the wireframe model data representative of the route, examining changes in the wireframe model data to identify a historical trend of changes in the image data, and comparing the historical trend of the changes in the image data with designated patterns of changes in the wireframe model data to determine when to request at least one of repair, inspection, or maintenance of the route.

In one aspect, the method also includes communicating a request signal to direct the at least one of repair, inspection, or maintenance of the route to be performed based on comparing the historical trend of the changes in the image data with the designated patterns.

In one aspect, the wireframe model data is created from different sets of the image data of the route acquired at the different times by the different vehicles.

In one aspect, the wireframe model data is created or the image data is modified into the wireframe model data by identifying at least one of pixels or other locations in the image data having image characteristics that are within designated ranges of each other and assigning a common image characteristic in the wireframe model data to the at least one of pixels or other locations having the image characteristics that are within the designated ranges of each other.

In one aspect, the image characteristics include at least one of intensities, colors, or luminance.

In one aspect, the method also includes filtering out changes in the image data caused by external factors other than damage to the route. The wireframe model data that is examined to identify the historical trend can include the wireframe model data after filtering out the changes in the image data caused by the external factors.

In one aspect, the historical trend of changes in the image data includes at least one of changes in a number of lines representative of the route in the image data, changes in spacing between segments of the lines in the image data, changes in lengths of the lines or the segments of the lines, or changes in gaps between the segments of the lines.

In another example of the inventive subject matter described herein, a system (e.g., a route damage prediction system) includes a conversion unit and an analysis unit. The conversion unit is configured to receive image data acquired at different times, the image data representing at least one of still images or video of a common segment of a route traveled by vehicles. The conversion unit configured to create wireframe model data from the image data. The analysis unit is configured to examine the wireframe model data to identify changes in the wireframe model data over time. The analysis unit also can be configured to examine the changes in the wireframe model data to determine when to request at least one of repair, maintenance, or inspection of the common segment of the route.

In one aspect, the conversion unit is configured to examine the image data to identify pixels in the image data having image characteristics that are within a designated range of each other and to create the wireframe model data by assigning a first designated image characteristic to the pixels having the image characteristics that are within the designated range of each other and assigning a different, second designated image characteristic to the pixels having the image characteristics that are not within the designated range of each other.

In one aspect, the image characteristics include at least one of pixel intensities, colors, or luminance.

In one aspect, the conversion unit is configured to create different sets of the wireframe model data representative of the image data at the different times, and the analysis unit is configured to compare the different sets of the wireframe model data to determine when to request the at least one of repair, maintenance, or inspection of the common segment of the route.

In one aspect, the vehicles are separate from each other. For example, the vehicles may be mechanically decoupled from each other such that the vehicles can travel on the route at different times, at different speeds, in different directions, or the like, relative to each other. The conversion unit can be configured to receive the image data from cameras disposed onboard the vehicles as the vehicles separately travel on the route at different times.

In one aspect, the analysis unit is configured to compare the changes in the wireframe model data with designated changes associated with at least one of different types or different degrees of damage to the common segment of the route.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
one or more cameras configured to obtain image data within one or more fields of view of the one or more cameras that include a route that is traveled upon by plural different vehicles, the route including a track having one or more rails, the image data including at least one of still images or video of the route obtained at different times;

a conversion unit including one or more computer processors configured to at least one of create wireframe model data based on the image data or modify the image data into the wireframe model data representative of the route, the wireframe model data including substantially parallel line segments that represent the one or more rails in the image data, the conversion unit further configured to filter out a temporary external factor on the one or more rails in the image data at a location of the route, the temporary external factor filtered out by combining at least one of different sets of the image data of the location of the route acquired at the different times or different sets of the wireframe model data of the location of the route that are based on the sets of image data to produce combined wireframe model data, wherein the temporary external factor is other than damage to the location of the route and is absent from the one or more rails in at least one of the sets of the image data; and an analysis unit including one or more computer processors configured to examine the line segments of the combined wireframe model data to identify changes to the line segments over time that represent a historical trend of changes to the one or more rails, wherein the analysis unit is configured to compare the historical trend of the changes to the one or more rails with designated patterns of changes in the wireframe model data to determine when to request at least one of repair, inspection, or maintenance of the route.

2. The system of claim 1, further comprising a communication unit configured to communicate a request signal to direct the at least one of repair, inspection, or maintenance of the route to be performed based on comparing the historical trend of the changes to the one or more rails with the designated patterns.

3. The system of claim 1, wherein the conversion unit is configured to at least one of create the wireframe model data or modify the image data into the wireframe model data by identifying at least one of pixels or other locations in the image data having image characteristics that are within designated ranges of each other, wherein the line segments correspond to groups of pixels or locations having image characteristics that are within the designated ranges of each other.

4. The system of claim 1, wherein the historical trend of changes to the one or more rails develops over time and includes at least one of changes in a number of the line segments representative of the one or more rails in the combined wireframe model data, changes in spacing between the line segments in the combined wireframe model data, changes in lengths of the line segments, changes in shapes of the line segments, or changes in gaps between the line segments.

5. The system of claim 1, wherein the designated patterns are predetermined patterns stored in a memory device, the analysis unit determining when to request at least one of repair, inspection, or maintenance of the route based on the historical trend of the changes to the one or more rails matching one of the predetermined patterns or more closely matching the one predetermined pattern over other predetermined patterns.

6. The system of claim 1, wherein the historical trend of changes to the one or more rails develops over time and includes at least one of changes in a number of the line segments representative of the one or more rails at a location of the route, decreases in lengths of the line segments representative of the one or more rails at the location, or changes in gaps between the line segments representative of the one or more rails at the location.

7. The system of claim 1, wherein the analysis unit is configured to compare the historical trend of the changes to the one or more rails to the designated patterns by comparing the changes to the line segments that represent the one or more rails to the designated patterns.

8. The system of claim 1, wherein the analysis unit is configured to identify the changes to the line segments based on one or more of the line segments at least one of bending, changing shape, or moving over time.

9. The system of claim 1, wherein the conversion unit is configured to combine the different sets of the image data of the location of the route to filter out the temporary external factor on the one or more rails by calculating an average or median image characteristic for at least some pixels in the different sets of the image data.

10. A method comprising:
receiving image data having one or more fields of view that include a route that is traveled upon by plural different vehicles, the route including a track having one or more rails, the image data including at least one of still images or video of the route obtained at different times;
at least one of creating wireframe model data based on the image data or modifying the image data into the wireframe model data representative of the route, the at least one of creating the wireframe model data or modifying the image data into the wireframe model data performed by one or more computer processors, the wireframe model data including substantially parallel line segments that represent the one or more rails in the image data;
filtering out a temporary external factor on the one or more rails in the image data at a location of the route to at least one of create the wireframe model data or modify the image data into the wireframe model data, the temporary external factor filtered out by combining at least one of different sets of the image data of the location of the route acquired at the different times or different sets of the wireframe model data of the location of the route that are based on the sets of image data to produce combined wireframe model data, wherein the temporary external factor is other than damage to the location of the route and is absent from the one or more rails in at least one of the sets of the image data;
examining the line segments of the combined wireframe model data to identify changes to the line segments over time that represent a historical trend of changes to the one or more rails; and
determining when to request at least one of repair, inspection, or maintenance of the route based on the historical trend of the changes to the one or more rails.

11. The method of claim 10, further comprising communicating a request signal to direct the at least one of repair, inspection, or maintenance of the route to be performed based on the historical trend of the changes to the one or more rails.

12. The method of claim 10, wherein the wireframe model data is created or the image data is modified into the wireframe model data by identifying at least one of pixels or other locations in the image data having image characteristics that are within designated ranges of each other and assigning a common image characteristic in the wireframe model data to the at least one of pixels or other locations having the image characteristics that are within the designated ranges of each other, wherein the at least one of pixels or locations having the common image characteristic form one of the line segments.

13. The method of claim 10, wherein the historical trend of changes to the one or more rails includes at least one of changes in a number of the line segments representative of the one or more rails in the combined wireframe model data, changes in spacing between the line segments in the combined wireframe model data, changes in lengths of the line segments, changes in shapes of the line segments, or changes in gaps between the line segments.

14. The method of claim 10, wherein the changes in the line segments of the combined wireframe model data include at least one of bending, changing shape, or moving of one or more of the line segments over time.

15. The method of claim 10, wherein the different sets of the image data of the location of the route are combined to filter out the temporary external factor on the one or more rails by calculating an average or median image characteristic for at least some pixels in the different sets of the image data.

16. A system comprising:
one or more computer processors configured to:
receive image data acquired at different times, the image data representing at least one of still images or video of a common section of a route traveled by vehicles, the route including a track having one or more rails;

create wireframe model data from the image data, the wireframe model data including substantially parallel line segments that represent the one or more rails in the image data;

examine the line segments of the wireframe model data to identify changes in the line segments of the wireframe model data over time, the changes including at least one of bending, changing shape, or moving of one or more of the line segments; and examine the changes in the line segments of the wireframe model data to determine when to request at least one of repair, maintenance, or inspection of the common section of the route;

wherein the one or more computer processors are also configured to filter out a temporary external factor on the one or more rails in the image data at a location of the route, the temporary external factor filtered out by combining different sets of the image data of the location of the route acquired at the different times, wherein the temporary external factor is other than damage to the location of the route and is absent from the one or more rails in at least one of the sets of the image data, and wherein the wireframe model data that is examined to identify changes in the line segments includes the wireframe model data after filtering out the temporary external factor on the one or more rails.

17. The system of claim 16, wherein the one or more computer processors are also configured to examine the image data to identify pixels in the image data having image characteristics that are within a designated range of each other and to create the wireframe model data by assigning a first designated image characteristic to the pixels having the image characteristics that are within the designated range of each other and assigning a different, second designated image characteristic to the pixels having the image characteristics that are not within the designated range of each other, wherein the pixels having the first image characteristic correspond to one of the line segments.

18. The system of claim 16, wherein the one or more computer processors are also configured to compare the changes in the wireframe model data with designated changes associated with at least one of different types or different degrees of damage to the common section of the route.

19. The system of claim 16, wherein the one or more computer processors are configured to combine the different sets of the image data of the location of the route to filter out the temporary external factor on the one or more rails by calculating an average or median image characteristic for at least some pixels in the different sets of the image data.

* * * * *